(12) United States Patent
Lo

(10) Patent No.: US 7,486,272 B2
(45) Date of Patent: Feb. 3, 2009

(54) ELECTRONIC DEVICE

(75) Inventor: Li-Chun Lo, Sinjhuang (TW)

(73) Assignee: Quanta Computer Inc., Tao Yuan Shien (TW)

( * ) Notice: Subject to any disclaimer, the term of this patent is extended or adjusted under 35 U.S.C. 154(b) by 828 days.

(21) Appl. No.: 11/023,609

(22) Filed: Dec. 28, 2004

(65) Prior Publication Data

US 2005/0146519 A1 Jul. 7, 2005

(30) Foreign Application Priority Data

Jan. 2, 2004 (TW) .............................. 93200029 U

(51) Int. Cl.
*G09G 5/00* (2006.01)
(52) U.S. Cl. ..................... 345/156; 345/169; 345/173
(58) Field of Classification Search ......... 345/156–169, 345/173–177, 501, 901; 341/22; 463/37
See application file for complete search history.

(56) References Cited

U.S. PATENT DOCUMENTS

| | | | | |
|---|---|---|---|---|
| 5,793,355 A | * | 8/1998 | Youens | 345/157 |
| 6,262,716 B1 | * | 7/2001 | Raasch | 345/168 |
| 6,388,660 B1 | * | 5/2002 | Manser et al. | 345/173 |
| 6,462,937 B1 | * | 10/2002 | Liao et al. | 361/680 |
| 6,493,218 B1 | * | 12/2002 | Fraga et al. | 361/683 |
| 6,909,423 B2 | * | 6/2005 | Wu et al. | 345/168 |
| 7,068,499 B2 | * | 6/2006 | Aisenberg | 361/683 |

* cited by examiner

*Primary Examiner*—Richard Hjerpe
*Assistant Examiner*—Mansour M Said
(74) *Attorney, Agent, or Firm*—Thomas, Kayden, Horstemeyer & Risley

(57) ABSTRACT

An electronic device. A host connected to a display device is equipped with a communication module and an index module. The host is operative between a first mode (ON) and a second mode (OFF). The communication module comprises a first and second communication units. The index module comprises a first index unit connected to the host and a second index unit connected to the communication module. When the host is "ON", the host is controlled by the first index unit and/or the second index unit. When the host is "OFF", the first communication unit and/or the second communication unit is/are controlled by the second index unit, and thus the user can still manually perform phone, modem and facsimile functions.

21 Claims, 3 Drawing Sheets

ELECTRONIC DEVICE

BACKGROUND

The invention relates to an electronic device, and in particular to an electronic device utilizing a touch module with a dial.

FIG. 1 is a perspective view of a related portable computer N. The portable computer N comprises a host n1, a display device n2, a touch pad n3, a keyboard n4 and a communication device n5.

The display device n2 is electrically connected to the host n1 to display images and sound data. The touch pad n3, the keyboard n4 and the communication device n5 are disposed and electrically connected to the host n1.

When the host n1 is ON, the display device n2 is ON and operates normally. The user manually operates the touch pad n3 and the keyboard n4 to control the communication device n5. The touch pad n3 and the keyboard n4 transmit data to the host n1, and the host n1 transmits data, uploading and/or downloading via a wireless and/or wired connection and performs functions such as phone, modem and facsimile via the communication device n5.

Traditionally, the host n1 provides power to the display device n2, the touch pad n3, the keyboard n4 and the communication device n5, i.e., the display device n2, the touch pad n3, the keyboard n4 and the communication device n5 are disabled when the host n1 is OFF or in a sleep mode.

SUMMARY

The invention provides an electronic device comprising a touch module and an index module, such that functions such as phone, modem and facsimile are operative even when the electronic device is OFF.

The electronic device comprises a host, a display device, a communication module and an index module. The host is operative between a first mode (ON) and a second mode (OFF). The display device is connected to the host. The communication module comprises a first and second communication units connected to the host. The index module comprises a first index unit connected to the host and a second index unit connected to the communication module.

The index module is a touch module, and the first index unit is a touch pad, and the second index unit is a dial unit. The communication module comprises a telecommunication unit and a modem.

When the host is in the first mode, the host is controlled by the first index unit and/or the second index unit. When the host is in the second mode, the first communication unit and/or the second communication unit is/are controlled by the second index unit. Thus, the user can manually perform phone, modem and facsimile functions while the electronic device is OFF.

A detailed description is given in the following embodiments with reference to the accompanying drawings.

DESCRIPTION OF THE DRAWINGS

The invention is more fully understood by reading the subsequent detailed description and examples with references made to the accompanying drawings, wherein.

DETAILED DESCRIPTION

Figure 1:
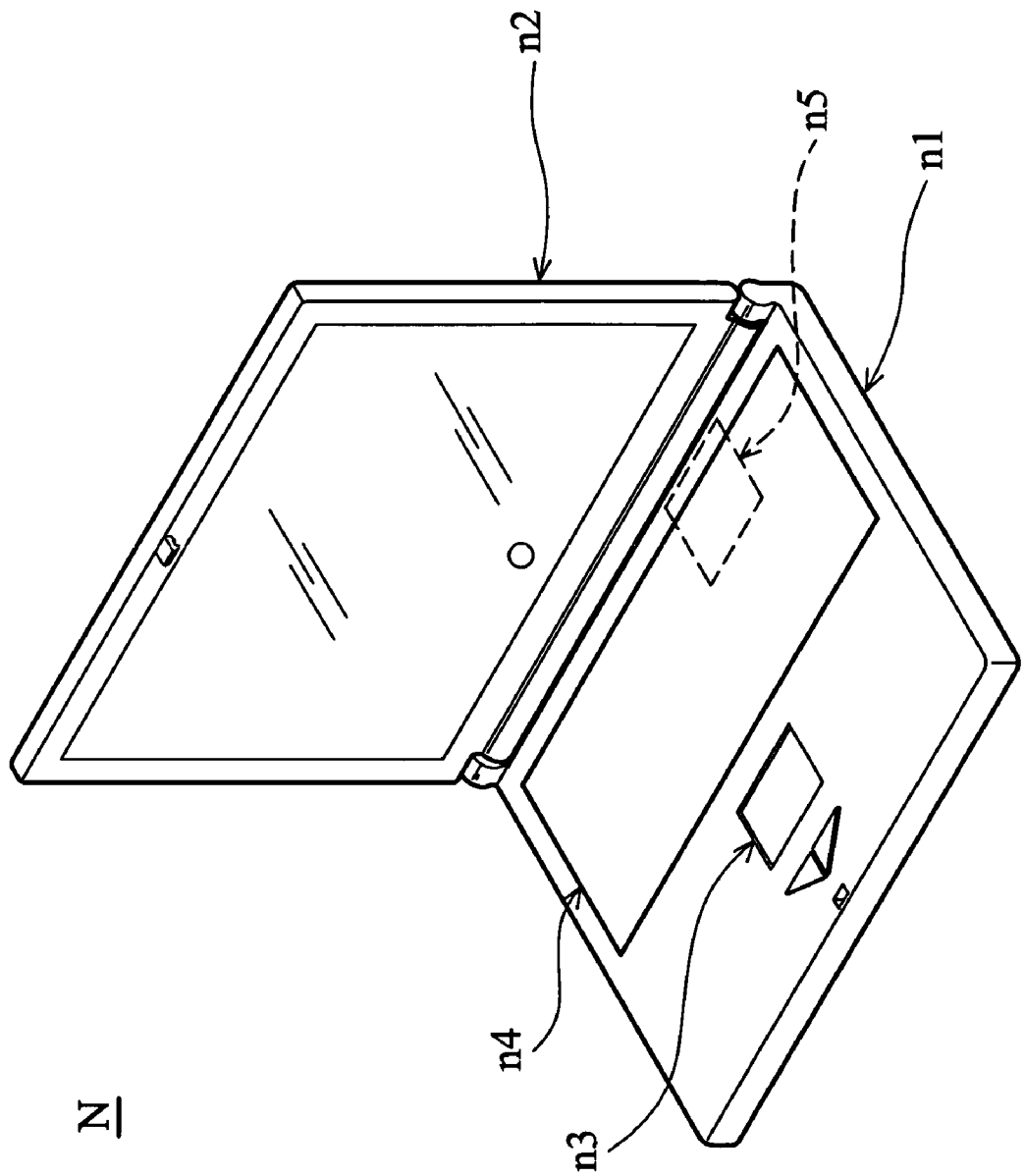
FIG. 1 is a perspective view of a related portable computer (N)
Figure 2:
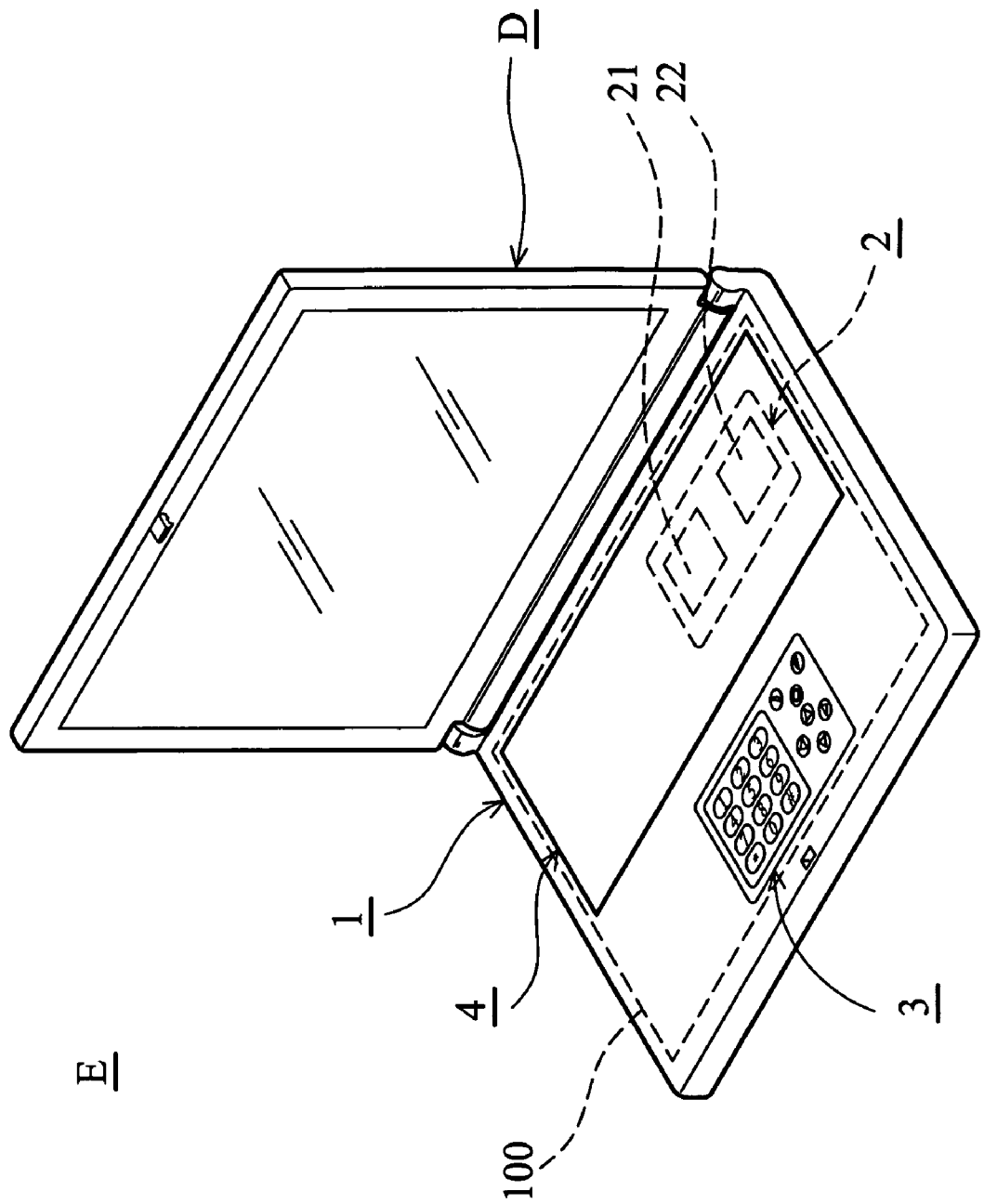
FIG. 2 is a perspective view of an electronic device (E) according to the invention.

Referring to FIG. 2, in an embodiment of the invention, an electronic device E such as a portable computer provides a host 1, a display device D, a communication module 2, an index module 3 and a keyboard 4. The display device D is pivoted on the host 1, and the communication module 2, the index module 3 and the keyboard 4 are disposed on the host 1.

The host 1, a main operating system for calculation, comprises a motherboard 100 installed with CPUs, Memory, etc., and storage devices such as harddrive, floppy, CD-ROM, etc.

The host 1 is operative between a first mode and a second mode. In this embodiment, the host in the first mode is ON and the host in the second mode is OFF. In the first mode, the host 1 operates normally; in the second mode, the host 1 is in a sleep or idle mode.

The keyboard 4 is electrically connected to the motherboard 100 to command and access data. The display device D is electrically connected to the motherboard 100 to display images and sound data, output from and/or input to the motherboard 100. The status of the display device D is the same with the host 1, i.e., in the first mode, the host 1 and the display device D normally operate; in the second mode, the host 1 and the display device D are both in a sleep or idle mode.

The communication module 2 comprises a first and second communication units 21, 22 connected to the motherboard 100 of the host 1. The host 1 transmits data, uploading and/or downloading by wireless and/or wire, and performs phone, modem and facsimile functions via the communication module 2. In this embodiment, the first communication unit 21 is a telecommunication unit or mobile phone, and the second communication unit 22 is a modem.

Figure 3:
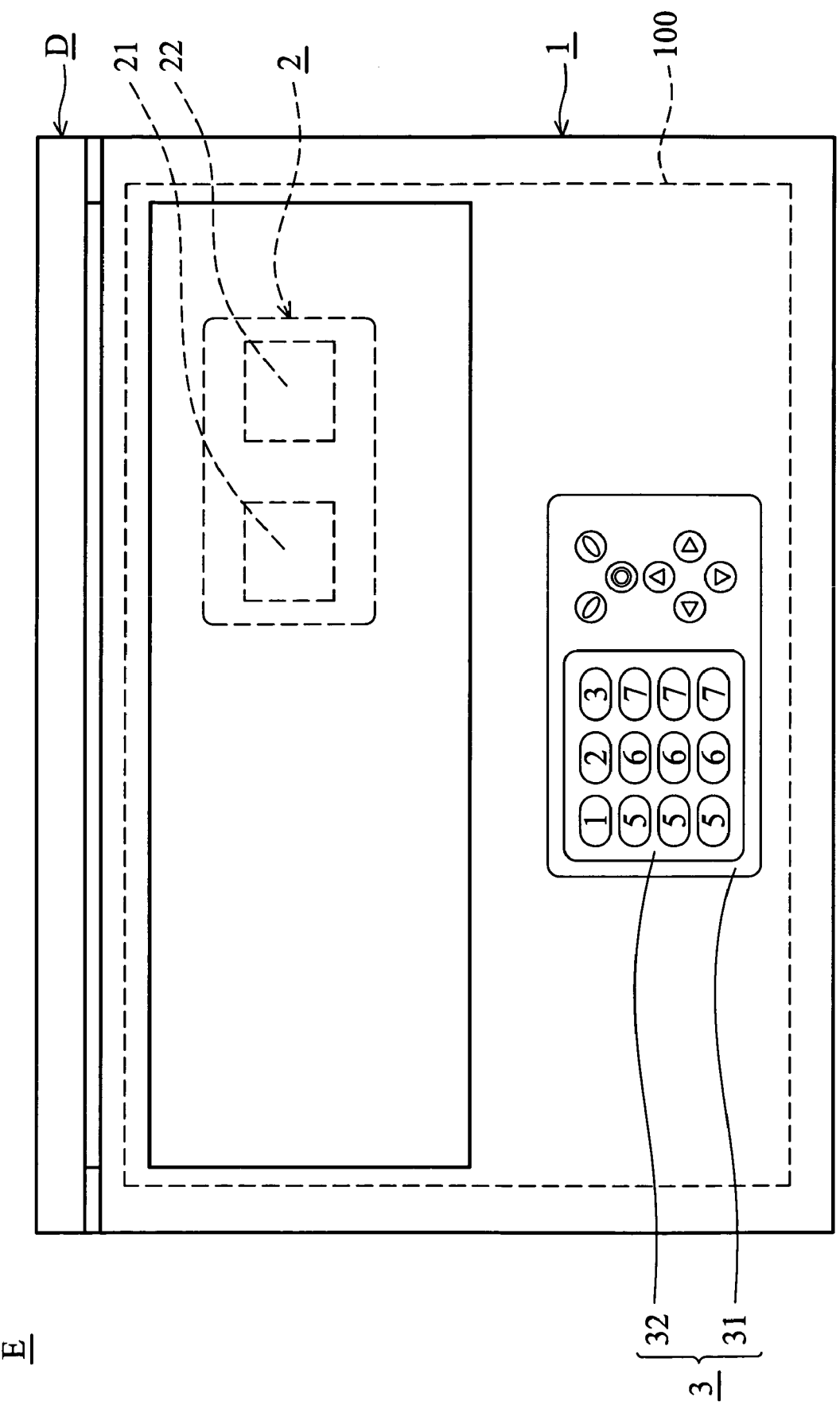
FIG. 3 is a top view of the electronic device (E) of FIG. 2.

In FIG. 3, a top view shows the configuration between the communication module 2 and the index module 3 of the electronic device E. The index module 3 is a touch module or screen, comprising a first index unit 31 connected to the motherboard 100 of the host 1 and a second index unit 32 connected to the communication module 2. In this embodiment, the first index unit 31 is a transparent general or touch pad, and the second index unit 32 is dial keys. Note that the second index unit 32 is integrally formed with the transparent first index unit 31, and the second index unit 32 is disposed within the transparent first index unit 31.

The index module 3 is characterized in that the transparent capacitive touch sensor is a transparent capacitive touch pad, a Film-compensated Super-Twisted Nematic (FSTN) liquid crystal display (LCD) module of glass construction with black pixels on a white background, a blue electro-luminescent (EL) backlight, with provisions for left and right buttons for mouse emulation, control electronics for all computer devices, and a single USB interface for all Pad functions are provided.

When the host 1 is in the first mode, i.e., "ON", the host 1 is controlled by the first index unit 31 and/or the second index unit 32, or using the first index unit 31 or the second index unit 32 separately to operate the host 1. Thus, the user operates the first and second index units 31, 32, manually to transmit data and perform phone, modem and facsimile functions.

When the host 1 is in the second mode, i.e., "OFF", the first and second communication units 21, 22 automatically connect to an auxiliary power system (not shown in FIGS.), i.e., the first and second communication units 21, 22 are operative and independent from the host 1. The first communication unit 21 and/or the second communication unit 22 is/are controlled by the second index unit 32. Thus, the user can manually perform phone, modem and facsimile functions even though the electronic device is OFF.

While the invention has been described with respect to preferred embodiment, it is to be understood that the invention is not limited thereto the disclosed embodiments, but, on the contrary, is intended to accommodate various modifications and equivalent arrangements included within the spirit and scope of the appended claims.

What is claimed is:

1. An electronic device, comprising:
a host, operative between a first mode and a second mode;
a communication module connected to the host; and
an index module comprising a first index unit connected to the host and a second index unit connected to the communication module;
when the host is in the first mode, the host is controlled by at least one of the first index unit and the second index unit of the index module; and
when the host is in the second mode, the communication module is controlled by the second index unit of the index module, and the communication module is automatically disconnected from the host and independently operated.

2. The electronic device as claimed in claim 1, when the host is in the first mode, the host is controlled by the first index unit and the second index unit of the index module; when the host is in the second mode, the host is controlled by the second index unit of the index module.

3. The electronic device as claimed in claim 1, wherein the index module comprises a touch module or a touch pad.

4. The electronic device as claimed in claim 1, wherein the second index unit is a dial unit.

5. The electronic device as claimed in claim 1, wherein the host in the first mode is ON, and the host in the second mode is OFF.

6. The electronic device as claimed in claim 1, wherein the communication module comprises a telecommunication unit or a modem.

7. The electronic device as claimed in claim 1 further comprising an auxiliary power system, wherein the communication module is automatically connected to the auxiliary power system for operation when the host is in the second mode.

8. The electronic device as claimed in claim 1, wherein the index module comprises a transparent capacitive touch sensor.

9. An electronic device, comprising:
a host operative between a first mode and a second mode;
an auxiliary power system;
a communication module comprising a first communication unit and a second communication unit, connected to the host; and
an index module comprising a first index unit connected to the host and a second index unit connected to the communication module;
when the host is in the first mode, the host is controlled by at least one of the first index unit and the second index unit of the index module; and
when the host is in the second mode, at least one of the first communication unit and the second communication unit is controlled by the second index unit of the index module, and the communication module is automatically connected to the auxiliary power system for operation, so that the first and second communication units of the communication module are operative and independent from the host.

10. The electronic device as claimed in claim 9, when the host is in the first mode, the host is controlled by the first index unit and the second index unit of the index module; when the host is in the second mode, the first communication unit and the second communication unit are controlled by the second index unit of the index module.

11. The electronic device as claimed in claim 9 further comprising a display device connected to the host.

12. The electronic device as claimed in claim 9, wherein the first index unit comprises a touch module or a touch pad.

13. The electronic device as claimed in claim 9, wherein the second index unit is a dial unit.

14. The electronic device as claimed in claim 9, wherein the host in the first mode is ON, and the host in the second mode is OFF.

15. The electronic device as claimed in claim 9, wherein the communication module comprises a telecommunication unit or a modem.

16. The electronic device as claimed in claim 9, wherein the electronic device comprises a portable computer.

17. The electronic device as claimed in claim 9, wherein the index module comprises a transparent capacitive touch sensor.

18. An electronic device, comprising: a host operative between a first mode and a second mode; a communication module connected to the host; and an index module comprising a transparent first index unit connected to the host and a second index unit connected to the communication module, wherein the second index unit is integrally formed with the transparent first index unit; when the host is in the first mode, the host is controlled by at least one of the transparent first index unit and the second index unit of the index module; when the host is in the second mode, the communication module is controlled by the second index unit of the transparent index module, wherein the communication module is automatically disconnected from the host and independently operated when the host is in the second mode.

19. The electronic device as claimed in claim 18 further comprising an auxiliary power system, wherein the communication module is automatically connected to the auxiliary power system for operation when the host is in the second mode.

20. The electronic device as claimed in claim 18, wherein the second index unit is disposed within the transparent first index unit.

21. The electronic device as claimed in claim 18, wherein the transparent first index unit of the index module is a touch module or a touch pad.

* * * * *